Dec. 19, 1922.　　　　　　　　　　　　　　　　1,439,337
F. R. SMITH.
CHANGE SPEED GEAR OPERATING MECHANISM FOR USE ON MOTOR VEHICLES AND THE LIKE.
FILED JULY 5, 1922.
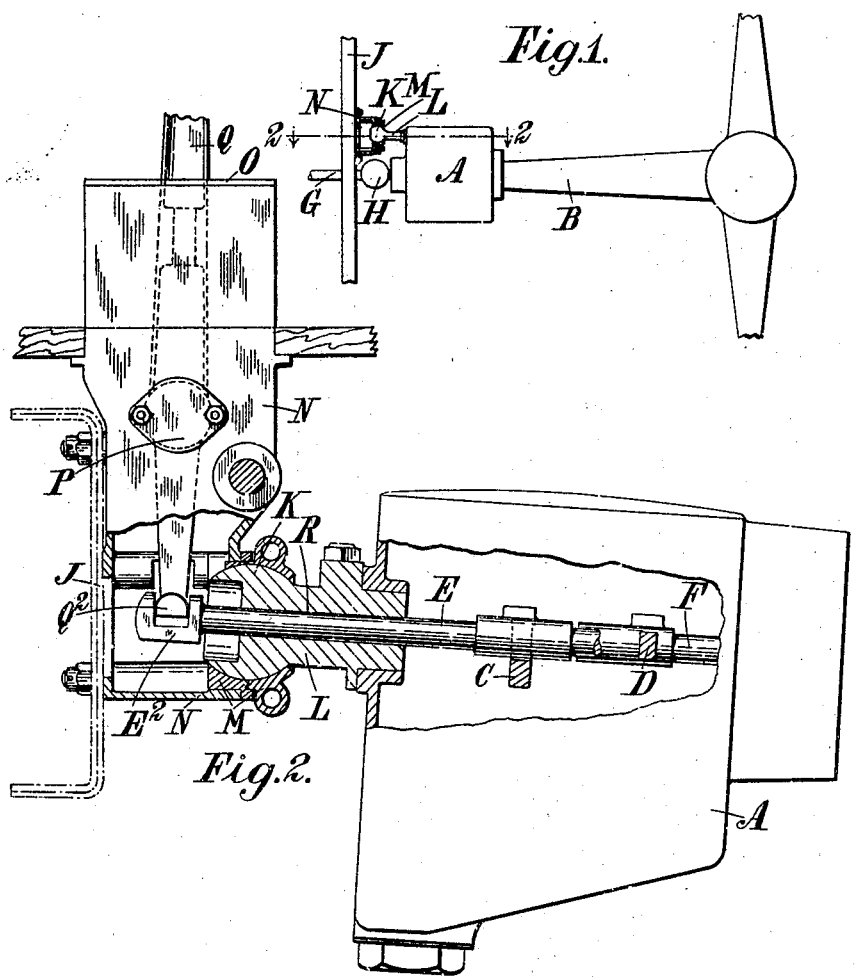

Patented Dec. 19, 1922.

1,439,337

UNITED STATES PATENT OFFICE.

FREDERICK ROBERTSON SMITH, OF COVENTRY, ENGLAND, ASSIGNOR TO ARMSTRONG SIDDELEY MOTORS LIMITED, OF COVENTRY, WARWICK, ENGLAND.

CHANGE-SPEED-GEAR-OPERATING MECHANISM FOR USE ON MOTOR VEHICLES AND THE LIKE.

Application filed July 5, 1922. Serial No. 572,912.

*To all whom it may concern:*

Be it known that I, FREDERICK ROBERTSON SMITH, a subject of the King of England, residing at Coventry, in the county of Warwick, England, have invented certain new and useful Improvements in Change-Speed-Gear-Operating Mechanism for Use on Motor Vehicles and the like, of which the following is a specification.

This invention relates to change speed gearing for use on motor vehicles, of the kind which consists of members slid sideways into and out of mesh with one another and actuated by striking forks carried by selector rods, each of which terminates in a jaw or fork engaged directly or indirectly by the change speed lever.

In the accompanying drawings,

Figure 1 is a diagrammatic plan of part of the chassis of a motor vehicle to show the type of change speed gearing to which this invention is applicable.

Figure 2 is a longitudinal section on a line such as 2—2 in Figure 1 showing one method of carrying out the invention.

Like letters indicate like parts throughout the drawings.

In some cases the change speed gear box A is mounted upon an unsprung part, such as the axle or the front end of the propeller shaft housing B, and the change speed lever Q is pivotally mounted upon a sprung part, such as a bracket attached to the main frame of the vehicle. In such cases the gear box is generally anchored to the bracket by means of a spherical joint shown at K.

On a rough road three different types of motion about this joint K may take place. Firstly, an oscillation about a horizontal axis, due to the rise and fall of the axle in relation to the frame; secondly, motion about a vertical axis, due to slight lateral movement of the axle relative to the frame; and thirdly, a torsional movement about the axis of the propeller shaft, or some axis parallel thereto, due to the rise of one wheel alone in relation to the frame. These three movements may of course be compounded, and as the jaws $E^2$ on the selector rods E are carried by the unsprung part and the change speed lever engaging them by the sprung part, the operating mechanism must permit of these movements to take place freely.

It is therefore the object of this invention to provide a design wherein the relative motion between the speed lever and the selector rods due to these movements is reduced to a minimum, and, at the same time, to produce a neat design and one which will possess certain advantages more fully specified later.

According to this invention, the selector rods E and F pass through the ball K which forms the inner member of the spherical anchorage, and the outer member M is carried by the bracket on which the change speed lever Q is mounted, whilst the jaws of the selector rods are located as close as is convenient to the centre of the ball K.

In the arrangement illustrated the gear box A is solidly attached to the front end of the propeller shaft housing B and it contains the usual sliding gear wheels or other members (not shown) whereby the changes of gear ratio are affected. These members are moved by striking forks C and D on selector rods E and F each of which projects at the front out of the gear box and terminates in a jaw such as $E^2$. Power enters the gear box by a shaft G connected with the driving shaft of the gear box by a universal joint H, and the gear box is supported upon a frame cross-member J being anchored thereto by means of the ball K on an arm L which ball is housed in a socket M formed upon or attached to the box-like bracket N.

At the top at O this bracket carries a quadrant or "gate" and about half way down is the pivotal mounting P for the speed lever Q which is free to oscillate in two directions at right angles to one another as usual, and near the bottom is attached the spherical socket M, which is in two parts separated by shims or packing pieces and bolted together and to the bracket.

The selector rods E and F, of which there are at any rate two, though there may be three in the case of a gear box providing four speeds forwards and a reverse, are passed through passages such as R in the stem L and ball and project into the box-like bracket N, where each terminates in a jaw such as $E^2$. The jaws are located as close as possible to the centre of the ball and the lower end $Q^2$ of the change speed lever enters these jaws in the well-known manner.

Usually owing to the relative motion between the end $Q^2$ of the change speed lever and the jaws on the selector rods when the vehicle is travelling on a rough road, considerable clearance has to be provided between the end $Q^2$ and the jaws, and the end $Q^2$ has to be rounded so that wear occurs rapidly at this point. By the present arrangement it is possible to provide large bearing surfaces between the lower end $Q^2$ of the speed lever and the jaws, which reduces wear at an important point; the selector rods are not visible externally and therefore a very neat appearance is obtained. Also relative motion of the axle in relation to the frame, of the three types referred to, produces extremely little relative movement between the jaws on the selector rods and the change speed lever, and such small movement hardly takes up the small working clearance which has to be provided at this point.

Furthermore, it is easy to remove the gear box and axle unit, as all that is necessary is to detach the quadrant O or "gate", move the change speed lever considerably to one side so that it is disengaged from the jaws on the selector rods, and then to disconnect the socket M from the bracket N, so that the ball, with the selector rods and gear box, comes away.

What I claim as my invention and desire to secure by Letters Patent of the United States is:—

1. In a motor vehicle, a frame, a driving axle, a change speed gear box rigidly connected to said axle, a ball carried by said gear box, a socket engaged by said ball and carried by said frame, selector rods in said gear box which extend through said ball, jaws on said selector rods located outside and close to said ball, and a change speed lever pivoted to said frame and adapted to engage said jaws, substantially as set forth.

2. In a motor vehicle, a frame, a box-like bracket attached to said frame, a driving axle, a change speed gear box rigidly connected to said axle, a ball carried by said gear box, a socket engaged by said ball and carried by said bracket, selector rods in said gear box which pass through said ball and into said bracket, jaws carried on said selector rods located outside and close to said ball, and a change speed lever pivoted to said bracket and adapted to engage said jaws, substantially as set forth.

In testimony whereof I have signed my name to this specification in the presence of two subscribing witnesses.

FREDERICK ROBERTSON SMITH.

Witnesses:
    PERCY JARRETT SMITH,
    LAURA A. STILWELL.